(12) United States Patent
Zou et al.

(10) Patent No.: US 6,432,563 B1
(45) Date of Patent: Aug. 13, 2002

(54) ZINC ENHANCED HARD DISK MEDIA

(75) Inventors: Jie Zou; David N. Lambeth; David E. Laughlin, all of Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/541,245

(22) Filed: Apr. 3, 2000

(51) Int. Cl.$^7$ .............................. G11B 5/66; G11B 5/70

(52) U.S. Cl. ........................... 428/694 TS; 428/694 T; 428/694 TM; 428/900

(58) Field of Search ................. 428/694 TS, 694 T, 428/900, 694 TM

(56) References Cited

U.S. PATENT DOCUMENTS

| | | | |
|---|---|---|---|
| 3,615,911 A | 10/1971 | Nesbitt et al. | 148/31.57 |
| 4,287,225 A | 9/1981 | Kneller et al. | 427/48 |
| 4,414,287 A | 11/1983 | Kneller et al. | 428/650 |
| 4,560,624 A | 12/1985 | Güttner et al. | 428/632 |
| 4,642,145 A | 2/1987 | Masumoto et al. | 148/336 |
| 4,652,499 A | 3/1987 | Howard | 428/641 |
| 4,735,840 A | 4/1988 | Hedgcoth | 428/65 |
| 4,743,491 A * | 5/1988 | Asada et al. | 428/213 |
| 4,820,584 A | 4/1989 | Morita et al. | 428/336 |
| 4,833,020 A | 5/1989 | Shiroishi et al. | 428/336 |
| 4,868,070 A | 9/1989 | Nagao et al. | 428/626 |
| 4,883,711 A | 11/1989 | Shiroishi et al. | 428/336 |
| 4,902,583 A | 2/1990 | Brucker et al. | 428/665 |
| 5,057,200 A | 10/1991 | Lal et al. | 204/192.15 |
| 5,061,537 A * | 10/1991 | Kobayashi et al. | 428/66 |
| 5,062,021 A | 10/1991 | Ranjan et al. | 360/135 |
| 5,118,564 A | 6/1992 | Shinohara et al. | 428/336 |
| 5,147,732 A | 9/1992 | Shiroishi et al. | 428/668 |
| 5,160,557 A | 11/1992 | Chang | 148/546 |
| 5,162,158 A | 11/1992 | Christner et al. | 428/611 |
| 5,192,626 A | 3/1993 | Sekiya et al. | 428/694 |
| 5,231,294 A | 7/1993 | Takeuchi et al. | 257/28 |
| 5,314,745 A | 5/1994 | Okumura | 428/336 |
| 5,344,706 A | 9/1994 | Lambeth et al. | 428/336 |
| 5,363,794 A | 11/1994 | Lairson et al. | 117/7 |

(List continued on next page.)

FOREIGN PATENT DOCUMENTS

| | | |
|---|---|---|
| EP | 0 526 044 A1 | 2/1993 |
| EP | 0 553 390 | 8/1993 |
| EP | 0 704 839 | 4/1996 |
| EP | 0 772 188 | 5/1997 |
| JP | 60-211638 | 10/1985 |
| JP | 62-164205 | 7/1987 |
| JP | 2-148411 | 6/1990 |
| JP | 5-109044 | 4/1993 |
| JP | 8-315326 | 11/1996 |

OTHER PUBLICATIONS

K. Hono, B. Wong, and D.E. Laughlin, "Crystallography of Co/Cr bilayer magnetic thin films," Journal of Applied Physics, vol. 68, No. 9, p. 4734 (1990).

(List continued on next page.)

Primary Examiner—Holly C. Rickman
(74) Attorney, Agent, or Firm—Kirkpatrick & Lockhart LLP

(57) ABSTRACT

The present invention provides a magnetic recording media incorporating Zn containing layers in close proximity to a magnetic layer to provide media having increased coercivity and lower noise. The Zn containing layer can be incorporated in a rotating, translating or stationary recording media to operate in conjunction with magnetic transducing heads for recording and reading of magnetic data, as well as other applications. The magnetic recording medium of the invention preferably includes a Co or Co alloy film magnetic layer, underlayer structures to promote epitaxial crystalline structure in the magnetic layer, and a Zn containing layer to promote isolation between the magnetic grains. The medium can further include seed layers, underlayers, intermediate layers, and overlayers. The process of manufacture includes promoting diffusion of Zn to the magnetic layer grain boundaries.

26 Claims, 9 Drawing Sheets

U.S. PATENT DOCUMENTS

| | | | |
|---|---|---|---|
| 5,403,547 A | 4/1995 | Smith et al. | 420/581 |
| 5,456,978 A | 10/1995 | Lal et al. | 428/332 |
| 5,463,578 A | 10/1995 | Gambino et al. | 365/122 |
| 5,506,017 A | 4/1996 | Ranjan et al. | 428/65.7 |
| 5,536,585 A | 7/1996 | Futamoto et al. | 428/611 |
| 5,582,897 A | 12/1996 | Kaneko et al. | 428/141 |
| 5,605,733 A | 2/1997 | Ishikawa et al. | 428/65.3 |
| 5,616,218 A | 4/1997 | Alex | 204/192.15 |
| 5,685,958 A | 11/1997 | Futamoto et al. | 204/192.2 |
| 5,693,426 A | 12/1997 | Lee et al. | 428/611 |
| 5,723,032 A | 3/1998 | Yamaguchi et al. | 204/192.2 |
| 5,796,560 A | 8/1998 | Saito et al. | 360/113 |
| 5,800,931 A | 9/1998 | Lee et al. | 428/611 |
| 5,993,956 A | 11/1999 | Lambeth et al. | 428/332 |
| 6,037,052 A * | 3/2000 | Chen et al. | 428/332 |

OTHER PUBLICATIONS

Wei Yang et al., "Expitaxial Ag templates on Si(001) for bicrystal CoCrTa media," Journal of Applied Physics, vol. 81, No. 8, p. 4370 (Apr. 15, 1997).

Li–Lien, David E. Laughlin and David N. Lamberth, "CrMn Underlayers for CoCrPt Thin Film Media," IEEE Trans. Magn., vol. 34, No. 4, pp. 1561–1563 (Jul. 1998).

David, A. Porter and Kenneth E. Easterling, *Phase Transformations in Metals and Alloys*, (Van Nostrand Reinhold Company), pp. 98–102.

R.W. Cahn and P. Haasen, eds., *Physical Metallurgy, Part 1* (North–Holland Physics Publishing, 1983).

Y.C. Feng, D.E. Laughlin and D.N. Lamberth, "Interdiffusion and Grain Isolation in Co/Cr Thin Films," IEEE Trans. Magn., vol. 30, No. 6 (Nov. 1994).

"Binary Alloy Phase Diagrams, Second Edition Plus Updates," (ASM International, 1996).

Nakamura et al., Epitaxial Growth of Co/Cr Bilayer Films on MgO Single Crystal Substrates, Journal of Applied Physics, vol. 32, pt. 2, No. 10A, Oct. 1993.

L.V. Azaroff, Elements of X–ray Crystallography, McGraw–Hill Book Company, pp. 68–69, 1968.

David E. Laughlin and Bunsen Y. Wong, The Crystallography and Texture of Co–Based Thin Film Deposited on Cr Underlayers, IEEE Transactions on Magnetics, vol. 27, No. 6, pp. 4713–4717, Nov. 1991.

T. Yamashita et al., Sputterd $Ni_xP$ Underlayer for CoPt–Based Thin Film Magnetic Media, IEEE Transactions on Magnetics, vol. 27, No. 6, pp. 4727–4729, Nov. 1991.

N. Tani et al., Effects of Substituted Elements into the Cr Layer on a CoNiCr/Cr Sputtered Hard Disk, J. Appl. Phys. 67(12), pp. 7507–7509, Jun. 15, 1990.

Rajiv Ranjan, Beta Tungsten Underalyer for Low–noise Thin–film Longitudinal Media, J. Appl. Phys. 67(9), pp. 4698–4700, May 1, 1990.

T. Kogure and S. Katayama, High–Coercivity Magnetic Hard Disks Using Glass Substrates, J. Appl. Phys. 67(9), pp. 4701–4703, May 1, 1990.

B.R. Natarajan and E.S. Murdock, Magnetic and Recording Properties of Sputtered Co–P/Cr Thin Film Media, IEEE Transactions of Magnetics, vol. 24, No. 6, pp. 2724–2726, Nov. 1988.

Jack H. Judy, Thin Film Recording Media, MRS Bulletin, pp. 63–72, Mar. 1990.

J.A. Christner et al., Low–Noise Metal Medium for High–Density Longitudinal Recording, J. Appl. Phys. 63(8), pp. 3260–3262, Apr. 15, 1988.

Nathan R. Belk et al., Measurement of the Intrinsic Signal–To–Noise Ratio for High–Performance Rigid Recording Media, J. Appl. Phys. 59(2), pp. 557–563, Jan. 15, 1986.

J.K. Howard, Thin Films for Magnetic Recording Technology: A Review, J. Vac. Sci. Technol. A, vol. 4, No. 1, pp. 1–13, Jan./Feb. 1986.

Jacques Daval and Denis Randet, Electron Microscopy on High–Coercive–Force Co–Cr Composite Films, IEEE Transactions of Magnetics, vol. Mag.–6, No. 4, pp. 768–773, Dec. 1970.

E.Y. Chuang and W. Tang, Elimination of CFC in Thin–Film Disk Manufacturing, ACCESS Selected Topics in Storage Technology, IBM San Jose, vol. V, No. 3, pp. 1–12, Third Quarter 1991.

M. Futamoto et al., Magnetic and Recording Characteristics of Bicrystalline Longitudinal Recording Medium Formed on an MgO Single Crystal Disk Substrate, IEEE Transactions on Magnetics, vol. 30, No. 6, Nov. 1994.

R. Ranjan et al., Laser Texturing for Low–Flying–Height Media, J. Appl. Phys. 69(8), pp. 5745–5747, Apr. 15, 1991.

"Development of High Resolution and Low Noise Signal–layered Perpendicular Recording Media for High Density Recording, "IEEE Trans. Magn., vol. 33, No. 1, p. 996–1001 (Jan. 1997).

"Compositional separation of CoCrPt/Cr films for longitudinal recording and CoCr/Ti films for perpendicular recording," IEEE Trans. Magn., vol. 27, No. 6, part 2, pp. 4718–4720 (1991).

IEEE Trans. Magn. vol. 32, No. 5, pp. 3840–3842 (Sep. 1996).

IEEE Trans. Magn. vol. 30, No. 6, pp. 4020–4022 (Nov. 1994).

Youping Deng, David N. Lambeth, David E. Laughlin, "Structural Characteristics of Bias Sputtered CoCrTa/Cr Films," IEEE Transactions on Magnetics, vol. 29, No. 5, Sep. 1993, pp. 3676–3678.

N. Inaba, M. Futamoto, and A. Nakamura, IEEE Trans. Magn., vol. 34, pp. 1558–1560 (1998).

J. Zou, D.E. Laughlin, and D.N. Lamberth, MRS Symp. Proc., vol. 517, pp. 217–222 (1998).

David E. Laughlin, IEEE Transactions on Magnetics, vol. 27, No. 6, Nov. 1991, p. 4713.

H. Mehrer, ed., Landolt–Bornstein: "Numerical Data and Functional Relationships in Science and Technology", vol. 26 (Springer–Verlag), p. 132.

M. Gronau et al., "The Magnetic Properties of Amorphous SmCo–Films", IEEE Transactions on Magnetics, vol. Mag–20, No. 1, Jan. 1984, p. 66–68.

W.T. Maloney, "Re–Sputtered Chromium–Cobalt Films for High–Density Longitudinal Magnetic Recording", IEEE Transactions on Magnetics, vol. Mag–15, No. 6, Nov. 1979, p. 1546–48.

W.T. Maloney, "Sputtered Multilayer Films for Digital Magnetic Recording", IEEE Transactions on Magnetics, vol. Mag–15, No. 3, Jul. 1979, p. 1135–37.

Swalin and Martin, "Solute Diffusion in Nickel–Base Substitutional Solid Solutions", Journal of Metals, Trans. AIME 206, 567ff, (May 1956) p. 567–572.

W.D. Kingery et al., "Structure of Crystals", Introduction to Ceramics, 2nd Ed., p. 69–70, (John Wiley & Sons, pub. 1976).

R. Chandrasekhar et al., "Properties of CoCrTa perpendicular films prepared by sputtering on platinum underlayer with different bias bonditions", Journal of Magnetism and Magnetic Materials 155, (1996), p. 206–208.

F. Jorgenson, "The Computer Handbook of Magnetic Recording", Chapter 16, Disk Drives, pp. 378–397.

* cited by examiner

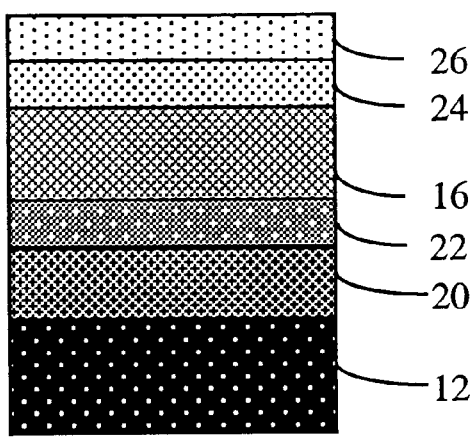 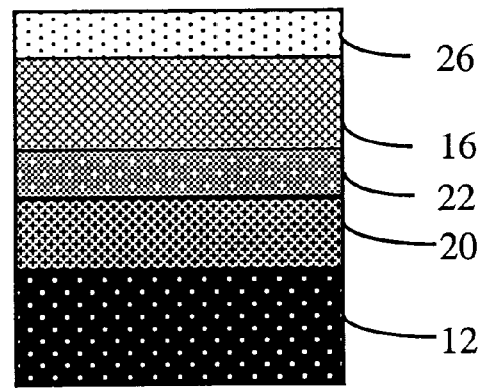
Figure 1 (d)　　　　　　　Figure 1 (e)

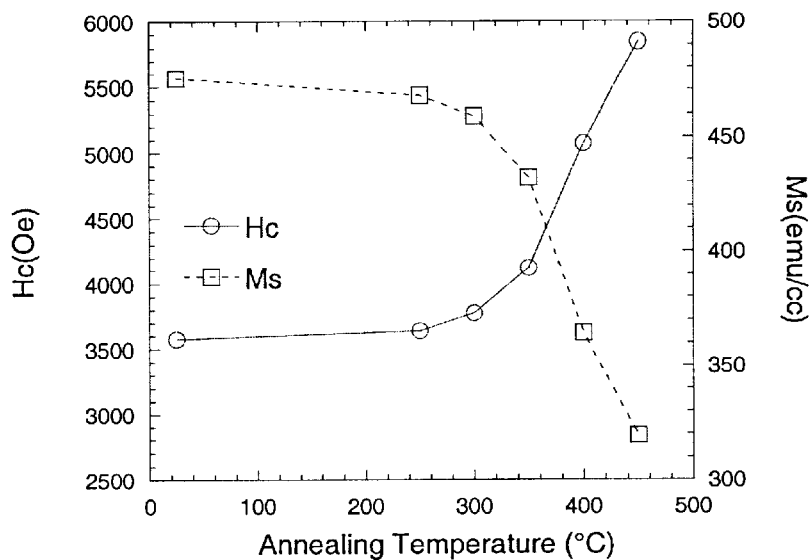

Figure 3. The coercivity and magnetization as functions of the annealing temperature for the sample with the Zn-containing layer. The annealing time is 1 minute.

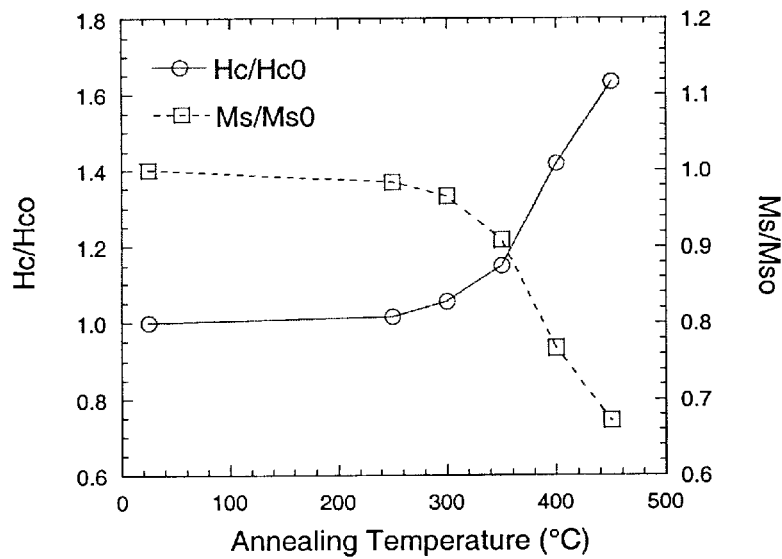

Figure 4. The normalized coercivity and magnetization as functions of the annealing temperature for the sample with the Zn-containing layer. The annealing time is 1 minute. Hco and Mso are the coercivity and magnetization in the as-deposited state.

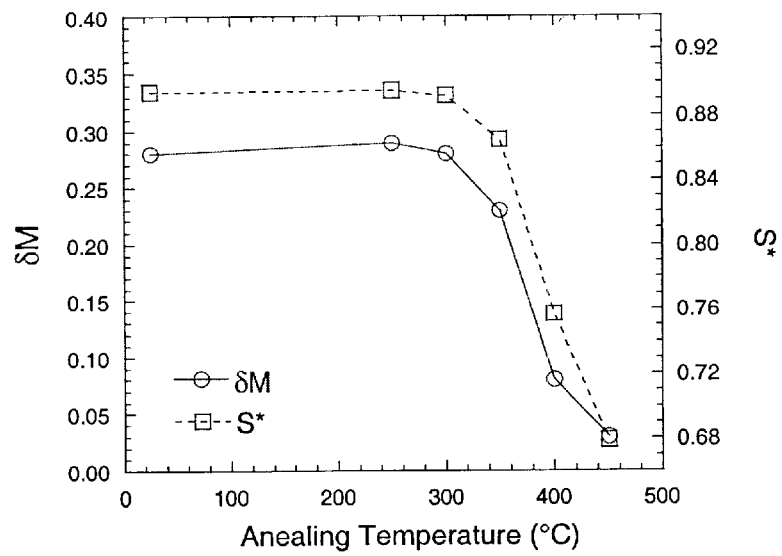
Figure 5. The δM peak value and coercivity squareness as functions of the annealing temperature for the sample with the Zn-containing layer. The annealing time is 1 minute.
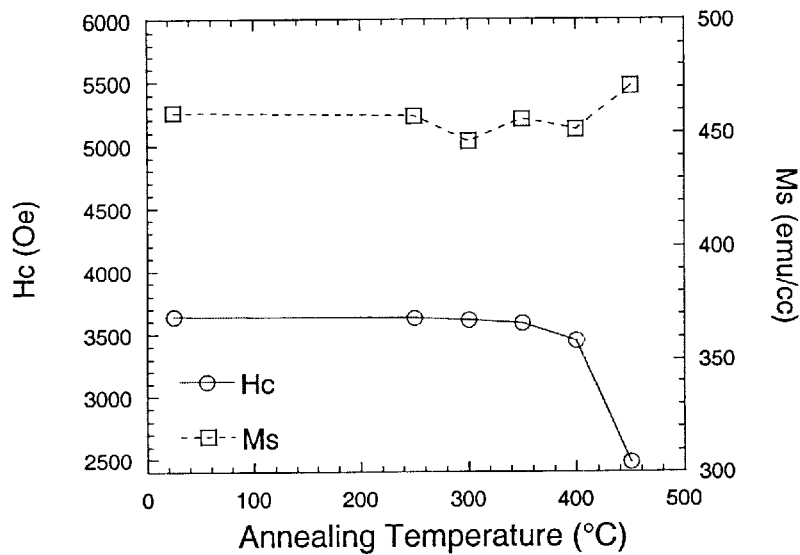
Figure 6. The coercivity and magnetization as functions of the annealing temperature for the sample without the Zn-containing layer. The annealing time is 1 minute.

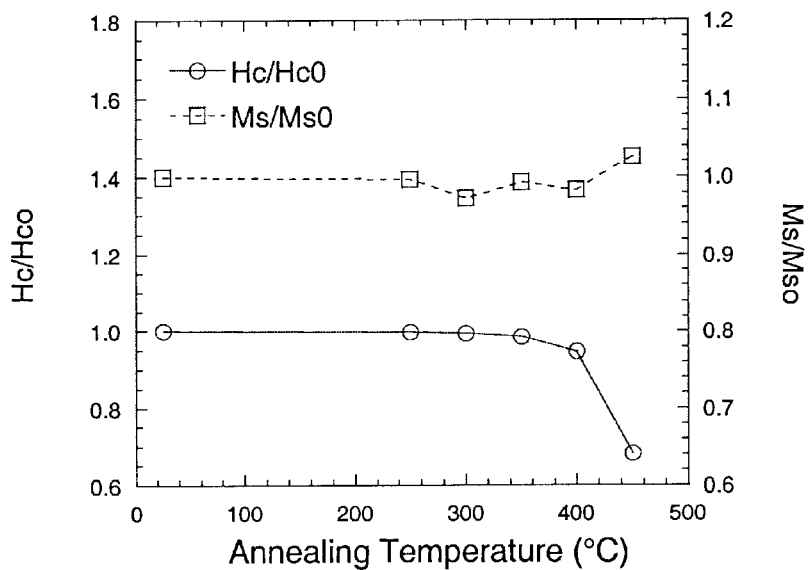

Figure 7. The normalized coercivity and magnetization as functions of the annealing temperature for the sample without the Zn-containing layer. The annealing time is 1 minute. Hco and Mso are the coercivity and magnetization in the as-deposited state.

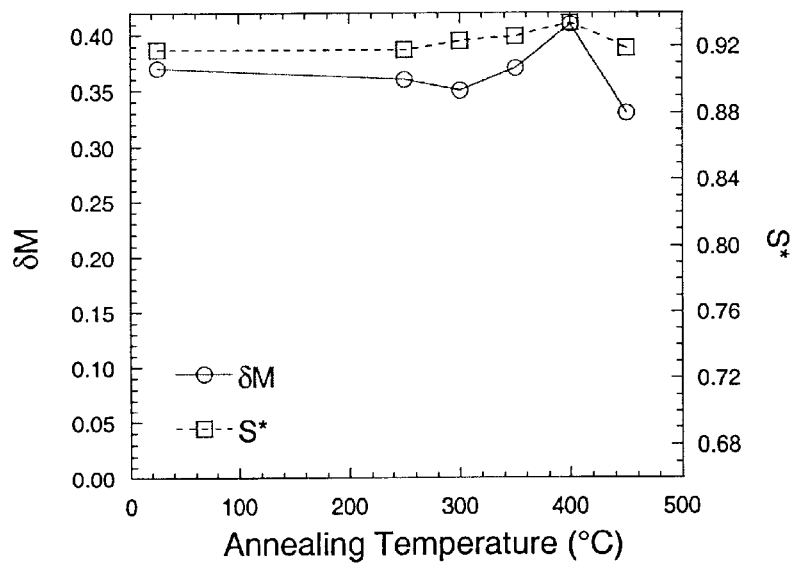

Figure 8. The δM peak value and coercivity squareness as functions of the annealing temperature for the sample without the Zn-containing layer. The annealing time is 1 minute.

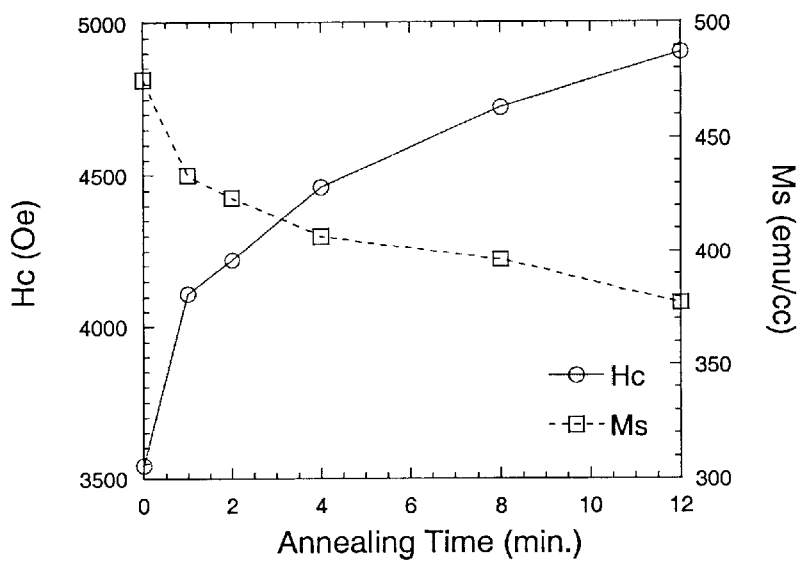

Figure 9. The coercivity and magnetization as functions of the annealing time for the sample with the Zn-containing layer. The annealing temperature is 350 °C.

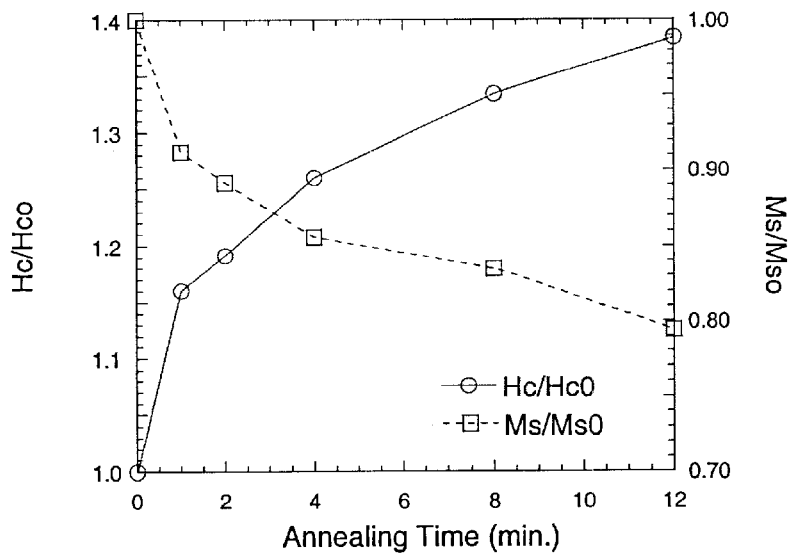

Figure 10. The normalized coercivity and magnetization as functions of the annealing time for the sample with the Zn-containing layer. The annealing temperature is 350 °C. Hco and Mso are the coercivity and magnetization in the as-deposited state.

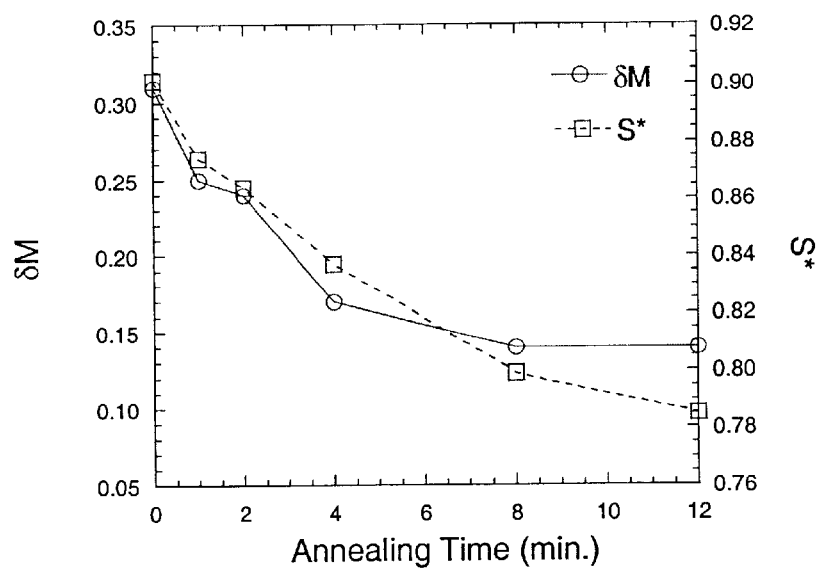
Figure 11. The δM peak value and coercivity squareness as functions of the annealing time for the sample with the Zn-containing layer. The annealing temperature is 350 °C.

ZINC ENHANCED HARD DISK MEDIA

STATEMENT REGARDING FEDERALLY SPONSORED RESEARCH

This work was supported in part under a Department of Energy contract, No. DE-FG02-90ER45423. The government may have certain rights to this invention.

BACKGROUND OF THE INVENTION

The present invention is directed generally to magnetic recording media and devices incorporating the media and, more particularly, to zinc (Zn) containing layers for use with cobalt or cobalt alloy based magnetic layers in the formation of magnetic recording media and the recording devices used in data storage.

As the home, office, transportation vehicle, business place and factory becomes more automated and electronically connected, and as electronic devices and appliances such as computers, communication devices, electronic games, entertainment systems, personal data assistants transportation systems, vehicles, manufacturing tools, shop tools, and home appliances become more sophisticated there is, and will be, an ever-increasing demand for low cost magnetic recording media with greater storage capacity. In order to keep the storage devices unobtrusive and inexpensive each product generation must store more information in a smaller space. Hence there are ever increasing demands for technical improvement of the media and storage systems.

In general this means that not only must media attributes be improved, but that the transducer used to record or retrieve the data must be capable of resolving extremely small distances and changes in the media. With the exception of a few optical storage systems, such as those based upon holographic processes or multi-photon processes, this means that for all future storage systems the transducer must be in extremely close proximity to the media. This is certainly the case for all modern magnetic recording systems, where the ability to resolve the recorded data falls off exponentially with distance between the transducer and the media. This is the case in perpendicular, isotropic or longitudinal magnetic recording systems such as used in hard disk, magnetic tape, and floppy disk systems. This is even the case in the proposed near field optical recording systems as well as for the envisioned future x-y addressable systems such as those that might be base upon micromachined silicon structures. What this means for the magnetic media is that in order to place the transducer close to the magnetic media, so that better resolution is possible, it is best if the magnetic media layer is very thin. Furthermore, there must not be much physical space allocated to be between the surface of the magnetic layer and the transducer, such as might be used for a physical wear layer or lubricant. However, some of these structures are required to actually have a working media. Clearly the entire structure must also be extremely smooth to allow the transducer to approach the media. Hence, since the early 1980s, as shown in the market place, there has been a movement toward thin film technology for the recording media. Thin media has enabled the rapid advances toward higher linear and areal recording densities.

Most commercially available thin film magnetic media is based upon hexagonal closed packed (HCP) cobalt alloys. This is because the HCP Co crystalline phase possesses both a relative large saturation magnetization, Ms, that can be adjusted by alloying, and a large uniaxial magnetocrystalline anisotropy energy density, Ku, which is necessary to achieve high coercivity, $H_c$. Certainly for hard disk drive storage, the linear storage density is directly related to the coercivity and so to the anisotropy energy density. Due to the statistical nature of the playback signal a minimum signal to noise ratio (SNR) is required from the recording system in order to guarantee accuracy in reading back the recorded data. For a number of years the SNR in data storage systems has been limited by the statistical nature of the media, as opposed to the other sources of noise such as Johnson noise of the electronics or transducer. Since the media is granular in nature and the data bit cell size is inversely related to the areal recording density the media magnetic switching unit size determines the maximum possible SNR and so areal recording density that can be supported. Even in what is referred to as continuously exchange coupled media the bit cell wall location is determined by localized fluctuations in the media properties and so its storage capability is controlled by the granularity of these fluctuation locations. It is also true in optical recording systems such as the Compact Disk ReWriteable (CD-RW) whether they be based upon magneto-optic, MO, or phase change, PC, media. Basically, the power SNR is proportional to the number of switching units contained in a given data cell. For example for typical, modern hard disk drives approximately 100 to 1000 switching units are required per data bit cell to achieve a sufficient SNR. With the SNR fixed for a given required system data retrieval reliability, this implies that the size of the switching units must be decreased to increase the areal recording density. Unfortunately, the magnetic switching unit size is not always as small as might be thought by measuring the magnetic crystalline grain size. For example, if two magnetic grains, or particles, directly touch then they commonly become magnetically exchange coupled via the material's electronic wave functions. This means that the two grains tend to switch as a single larger unit. This reduces the number of particles or switching units in a data bit cell and causes the media noise to be worse. Because the two grains are usually not oriented in the same direction it also tends to lower the overall anisotropy energy density for the switching unit to a smaller value than that predicted for a single crystal grain. Also, if the crystalline grains are not perfect in structure, including crystalline defects or defects in the surface quality, the Ku value will be less than predicted from bulk crystalline measurements. Lowering Ms can lower Hc, but if Ms does not decrease as fast as Hc increases then it must be due to other effects, such as improved effective Ku. Both of these effects may compromise the coercivity of the media and limit the recording density. Hence, it is a major objective in the construction of magnetic media to have small, isolated magnetic switching units with sufficient anisotropy energy density to provide a coercivity to record short wavelength data bit patterns.

One measurement method developed to determine whether or not magnetic grains are exchange coupled is referred to as the delta M, dM, method. This bulk magnetic measurement compares the difference between the initial magnetization process, from the demagnetized state, to the reversal process from the saturated magnetic state. If there is little fundamental difference between these two magnetization processes then the magnetic particles are said to be non-interacting and the dM values will approach zero. If the dM values are positive then for Co based longitudinal media magnetic grains are said to be exchange coupled. Hence, a near zero or negative dM value is a reasonable measure indicating the media grains are de-coupled.

For longitudinal disk magnetic recording, the recording performance must look the same at all locations around the concentrically recorded tracks on the disk. This usually implies that the disk media has a set of magnetic particles that are randomly oriented with respect to the circumferencial location on the disk. It is the function of the media materials and media construction and process to achieve these attributes and more. Historically, a mechanical grooving in a circumferencial direction of the disk surface, sometimes called mechanical texture, has been used to create a slight orientation of the magnetic direction of the magnetic particles. However, the maximum that has been achieved is quite small. This orientation is measured by determining the ratio of magnetic properties when measure along the circumference direction versus the radial direction on the disk. The ratio of the coercivity, $H_c$, or the remanent magnetization, $M_r$, values when measured along these two directions, is referred to as the orientation ratio, O.R. Typical ratios obtained by using mechanically grooved substrates are only about 1.1 to 1.2.

Recently it has been noted that, if the product of the magnetic grain volume and the anisotropy energy density is too low, compared to thermal vibration energies, $k_BT$, the magnetization of a switching unit may spontaneously reverse due to thermal fluctuations. That is, the magnetization of each switching unit may thermally decay to a random state rendering previously stored data useless. Hence, for a given anisotropy energy density, there is a minimum volume for the magnetic switching unit for which the data will be stable over a reasonable time period. This then can place a lower limit on the magnetic grain size and hence an upper limit on the possible areal recording density. At first assessment one would think he could simply choose a magnetic material with a higher anisotropy energy density to avoid this instability. However, if Ku is too high then the recording transducer cannot reverse the magnetization of each switching unit (i.e. record or erase data) in a short period of time. Hence, it is desirable to have a magnetic media with each magnetic switching unit being as small as possible to provide an acceptable SNR, but of high crystalline quality so as to achieve the maximum intrinsic Ku value. If more than one crystalline grain switches together as a unit the media appears to have a smaller number of grains, a larger distribution of magnetic particle sizes, and a higher media noise level. Furthermore, the Ku value appears to be compromised. Hence, it is very desirable that the magnetic switching unit size be determined by the crystalline grain dimension and this is achieved by isolating the individual crystalline grains. Small improvements in the media microstructure can evidently provide very large improvements in the thermal stability. This is evidenced by the fact that the media with an O.R of only slightly higher than one, where one represents total in plane random orientation of the grains, can be more thermally stable. However, some hard disk media substrates, such as glass and glass ceramics, cannot easily be mechanically grooved circumferencially and so cannot benefit from this method to improve thermal stability. Hence, new methods to improve the media microstructure to narrow the particle size distribution and to promote smaller, isolated magnetic grains with defect free perfect crystalline order are needed.

The structure of a typical thin film hard disk media is multilayered and includes a substrate at its base covered by an underlayer structure, a magnetic layer structure and optionally, an overlayer at the top. The overlayer is usually coated with a very thin overcoat layer and an organic lubricant. This overcoat is usually made of a hard form of carbon and provides mechanical, as well as some corrosion protection.

The underlayer structure maybe composed of multiple underlayers with multiple functions, such as, seed layers to initiate the film growth morphology; followed by underlayers used to set the grain size, size distribution and to set or improve the crystalline texture; and intermediate layers usually used to transition from one crystal structure to another or from one lattice atomic spacing to another. In most cases the layers are each epitaxially grown on the previous layer, grain on grain, and the final surface of the underlayer structure is usually used to induce epitaxial growth in the following magnetic structure. The underlayer structure can also provide the function of physical isolation of other layers from the substrate. In some cases, where the substrate is electrically insulating, they can provide a conductive base so that electrical contact can be made between the new media substrate surface and the deposition system.

The magnetic layer is the main body on which the magnetic bits are recorded. State of the art recording media is comprised of cobalt or cobalt alloy-based magnetic films having a hexagonal close packed, HCP, crystal structure and the underlayer is used to induce this crystal structure and to prevent the magnetically soft FCC phase of Co from developing. In its simplest form the underlayer structure has been composed of a bcc Cr or CrX alloys. Where the some of the alloying elements, X, that have been reported in the literature have been (X=C, Mg, Al, Si, Ti, V, Co, Ni, Cu, Zr, Nb, Mo, La, Ce, Nd, Gd, Tb, Dy, Er, Ta, and W). Other non-Cr elements reported are Ti, W, Mo and NiP. While there would appear to be a number of underlayer materials available, in practice only a very few materials work well enough to meet the demands of the industry. Among them, the most successful and often used underlayers are Cr and Cr alloys, where elements such as V, Mo, Ti, and W where these elements have been used to modify the lattice constant to better match that of the Co-alloy. U.S. Pat. No. 4,652,499 discloses efforts to improve the underlayer of longitudinal magnetic media by adding vanadium (V) to Cr to change its lattice constant and thereby to promote a better lattice matching between the HCP Co alloy, such as CoPt or CoPtCr, and the BCC CrV underlayer. Likewise, Mo and Ti have also been used to expand the Cr lattice constant.

This modification of the lattice constant is especially needed when the large Pt atom is included in the Co-alloy. However, more recently, especially on insulating substrates such as glass and glass ceramics rather than the traditional NiP coated AlMg substrates, a NiAl or FeAl bcc derivative crystal structure film has been introduced between the substrate and the Cr underlayer to induce a unique (112) crystal texture and to reduce the grain size. This texture then induces the very desirable Co (10.0) unicrystal texture. This is described in U.S. Pat. No. 5,693,426, which is incorporated herein by reference. Hence, as used herein a "bcc" structure shall include both body centered cubic and body centered cubic derivative crystal structures, such as the B2, $DO_3$, and the $L1_2$ crystal lattices. The notation 10.0, for example, and other crystalline texture notations showing the number and dot notation used throughout are equivalent to the conventional number and bar overwrite notations. For example, $10\bar{1}0$ is equivalent to 10.0, and $11\bar{2}0$ is equivalent to 11.0. Both systems of notation are well known in the art.

As just described, for high density longitudinal recording, in plane orientation has heretofore been achieved by grain-to-grain epitaxial growth of the HCP Co alloy thin film on a bcc underlayer. The polycrystalline Co-based alloy thin film is deposited with its c-axis, the [00.2] axis, either parallel to the film plane or with a large component of the c-axis in the film plane. It has been shown by K. Hono, B.

Wong, and D. E. Laughlin, "Crystallography of Co/Cr bilayer magnetic thin films", Journal of Applied Physics 68 (9) p. 4734 (1990), that BCC Cr underlayers promote grain-to-grain epitaxial growth of HCP Co alloy thin films deposited on these underlayers. The heteroepitaxial relationships between BCC Cr and HCP Co which bring the [00.2]Co axis down or close to the film plane are (11.0)Co// (002)Cr, and (10.1)Co//(110)Cr. This work was based upon the sputter deposition process on to glass or NiP plated Al substrates and the different Co/Cr epitaxial relationships prevail as the Cr texture varied for different deposition processes. While the relationship (10.0)Co//(110)Cr was also reported, it has since been shown by growing extremely well oriented Cr films on various single crystal Si substrates that this relationship does not occur. See Wei Yang et al., "Epitaxial Ag templates on Si(001) for bicrystal CoCrTa media," Journal of Applied Physics, vol. 81, No. 8, p. 4370 (Apr. 15, 1997). The Cr (110) texture always results in a Co (10.1) texture. It has since been shown that to obtain the Co(10.0) texture a BCC (112) texture is desired. To form a good media the Co alloy needs to form the HCP crystalline structure. Each of these BCC textures tend to promote the Co HCP. However, the (10.0) Co //Cr(112) provides for the most defect free Co grain with c-axis fully in-plane and so it the most desirable. The second most desirable is the (11.0)Co//(002)Cr as the c-axis is fully in-plane, but the grains suffer from defects and from binary variants resulting in a lowered anisotropy energy density. The (10.1)Co//(110) Cr relationship is the least desirable as the grains suffer from both defects, variants and a c-axis that is oriented at about 28 degrees with respect to the media plane. To obtain a good BCC structure, which promotes the formation of the HCP structure, the Cr underlayer should be thicker than about 50 Å.

Some longitudinal media products use the Cr alloy in direct contact with the Co alloy while others place a non-magnetic HCP CoCr alloy as an intermediate layer between the Cr alloy and the Co alloy. The 30 to 40 atomic percent Cr in the CoCr alloy renders it non-magnetic, but its HCP crystal structure can provide the transition between bcc to HCP crystal structures without increasing the thickness of the magnetic layer structure.

Likewise, to achieve perpendicular high density recording media, the perpendicular orientation of the Co c-axis with respect to the film plane has usually been obtained by grain-to-grain epitaxial growth of the HCP Co alloy thin film to an oriented HCP underlayer of (00.2) crystalline texture. Ti and Ti90Cr10at % are often cited as the best seed layers. for this purpose, although other seed layers, such as Pt, CoO/Pt and non-magnetic HCP CoCr35at % have been used to induce this structure. See "Development of High Resolution and Low Noise Single-layered Perpendicular Recording Media for High Density Recording", IEEE Trans. Magn., Vol. 33, no. 1, p. 996–1001 (January 1997); "Compositional separation of CoCrPt/Cr films for longitudinal recording and CoCr/Ti films for perpendicular recording" IEEE Trans. Magn., Vol. 27, no. 6, part 2, pp. 4718–4720 (1991); "Properties of CoCrTa Perpendicular films prepared by sputtering on Pt underlayer", J. MMM, Vol. 155, no. 1–3, pp. 206–208 (1996); IEEE Trans. Magn. Vol. 32, no. 5, pp. 3840–3842 (September 1996); IEEE Trans. Magn. Vol., 30, no. 6, pp. 4020–4022 (Nov. 1994); and, "Development of High Resolution and Low Noise Single-layered Perpendicular Recording Media for High Density Recording", IEEE Trans. Magn. Vol. 33, no. 2, pp. 996–1001) (January 1997).

For a period of time the longitudinal magnetic layer could have been composed of more than one magnetic layer. However, as the recording density has increased and the need to make the layer thin has become more important the magnetic layer structure is usually reduced to a single or at most two magnetic layers or a single magnetic layer in contact with an antiferromagnetic layer. As noted in Li-Lien Lee, David E. Laughlin and David N. Lambeth, "CrMn Underlayers for CoCrPt Thin Film Media," IEEE Transactions on Magnetics, Vol. 34 (4), July 1998, pp. 1561–1563 an antiferromagnetic layer coupled to the magnetic layer may improve the coercivity and thermal stability of the media by effectively increasing the volume of the magnetic grain without lowering the SNR. Cobalt-based alloys as opposed to pure cobalt are commonly used in longitudinal and perpendicular magnetic media for a variety of reasons. For example, non-magnetic elements such as Cr are commonly bulk doped into the magnetic film to lower the magnetization. This increases the coercivity, but does not improve thermal stability. This lowering of Ms is especially important in perpendicular media where the demagnetization energy associated with the magnetic moment of the alloy must be less than the magneto-crystalline anisotropy energy in order for the magnetization to be oriented perpendicular to the media film plane. The same technique is used in longitudinal magnetic media to lower the flux transition demagnetization energy, resulting in a shorter flux transition length and, hence, higher recording densities. Even more importantly, however, non-magnetic elements are introduced into the Co-alloy to limit the magnetic exchange coupling between cobalt grains. It is believed that preferential diffusion of elements such as Cr, P, or B from the bulk of the magnetic grain to the grain boundaries during film growth help to isolate the individual grains by reducing the magnetic exchange coupling between grains. This then results in a significantly lower media noise. For example, Deng et al. found that the addition of small amounts of Ta to CoCr alloys resulted in the increased Cr diffusion to the grain boundaries. See Youping Deng, David N. Lambeth, and David E. Laughlin, "Structural Characteristics of Bias Sputtered CoCrTa/Cr Films", IEEE Transactions on Magnetics, Vol. 29, no. 5, September 1993, pp. 3676–3678.

The recording attributes, such as signal level, media noise level, linear and areal recording density, and thermal stability are directly dependent upon the magnetic media properties. Hence, proper magnetic media properties, such as anisotropy (Ku), coercivity (Hc), coercive squareness (S*), remanant magnetization (Mr) remanant squareness (S), and delta M values are crucial to the recording performance. For a given magnetic alloy composition, these magnetic properties are primarily dependent on the microstructure of the film. For thin film longitudinal magnetic recording media, the desired crystalline structure, or texture, of the modem Co alloys is hexagonal close packed (HCP) with a uniaxial crystalline anisotropy directed along the crystalline c-axis located predominately in the in the plane of the film (i.e., in-plane). Usually, the better the in-plane c-axis crystallographic texture, the higher the coercivity of the Co alloy thin film used for longitudinal recording. High coercivity is required to achieve a high remanence. A high anisotropy is required to achieve a high degree of thermal stability of the recorded patterns. Likewise for perpendicular magnetic recording media the desired crystalline structure of the Co alloys is HCP with the uniaxial anisotropy and crystalline c-axis must lying perpendicular to the film plane. Due to thermal stability issues and surface imperfections, for very small grain size coercivity increases with increased grain size. Large grains, however, results in greater media noise and if the grains become too large domain walls can be nucleated internally to lower the coercivity dramatically. Or if the large grains are actually composed of exchange coupled clusters of smaller grains then both the media noise and the coercivity degrades. Exchange coupled magnetic grains tend to switch their magnetization together, instead of independently, when a magnetic field is applied. Thus, a group of these exchange-coupled grains can act effectively as a large magnetic grain during recording, which significantly increases the transition noise of the recording media. Hence, as mentioned previously, isolation of the magnetic grains is very critical in obtaining low noise and a high coercivity thin film magnetic recording media. Also, because of the variation in the magnetocrystalline anisotropy direction in going from the region of one grain to another, granular exchange coupling promotes magnetic reversal via domain wall motion across these magnetic exchange coupled grain boundaries, resulting in lower coercivity. Hence, there is a need to achieve high coercivities without the increase in noise associated with large grains or clusters of grains.

As mentioned the use of Cr and B in the Co alloys is a widely adopted approach used to achieve grain isolation via segregation at the grain boundaries for a variety of Co alloys. However, a relatively high Cr concentration in CoCrX alloys is required for significant Cr segregation. But as noted by N. Inaba, M. Futamoto, and A. Nakamura, IEEE Trans. Magn., vol. 34, pp. 1558–60 (1998), the crystalline anisotropy energy density decreases with increased Cr content. This is undesirable as a high anisotropy energy density is required in order to obtain a high coercivity and is absolutely necessary to stabilized the recorded data against thermal decay. Hence, other methods of promoting grain boundary isolation are being explored. In fact, U.S. Pat. No. 5,993,956, "Manganese Containing Layer for Magnetic Recording Media," which is incorporated herein by reference, and J. Zou, D. E. Laughlin, and D. N. Lambeth, MRS Symp. Proc., vol. 517, pp. 217–22 (1998) discusses the use of a Manganese (Mn) containing layer in contact, or near contact, to the Co-alloy layer. These layers can be either under or on top of the magnetic layer and can be separated from the magnetic layer by other thin layers provided they can still diffuse to the magnetic layer interface. In these teachings, diffusion of the Mn along and to the Co-alloy grain boundaries tends to break the magnetic exchange coupling between the Co-alloy grains. Hence, allowing the grains to function magnetically as isolated units and not as large clusters of grains. However, other than Mn, few materials have been reported to be very effective at this type of grain isolation via grain boundary diffusion from another layer without degrading the magnetic properties of the magnetic layer.

Diffusion distances into Co can be estimated by the following temperature dependent equation:

$X^2 = Dt$

Where:

$D = D_0 \exp(-Q/RT)$ $X^2$ is the square of the distance that a species diffuses, D is called the diffusional coefficient, t is the time spent at elevated temperature, $D_0$ is a constant for a given diffusing species, R is the universal gas constant or 1.98719 cal/mole-K, and Q is the activation energy for diffusion of the species into the Co grains.

From this diffusion equation one can see that the square of the distance of diffusion is only linear in time, but is thermally activated and so is an exponential in temperature (Kelvin). This means that the diffusion is a strong function of temperature so temperature plays a very important role in the diffusion process. A typical values for the activation energy for Mn diffusing in Co can be estimated from the data of Swalin and Martin (Trans AIME 206, 567ff, 1956). While these values are actually that for Mn diffusing in Cu, they will be similar to the values for Mn diffusing in Co since Cu and Co have similar atomic sizes. If the Mn is raised from 150° C. (423° K.) to 250° C. (523° K.) °C. the diffusion coefficient, D, increases 10 fold. Hence, Mn would diffuse 3.3 times as far for this 24% increase in temperature. This huge difference illustrates the strong effect of temperature on the diffusion. From the equation we can see that a comparable difference in the activation energy would have an equally resounding effect. Hence, since the activation energy for diffusion along grain boundaries is considerably less than that for diffusion into the bulk of a material, diffusion from an adjacent layer to another layer first takes place via the grain boundaries. For example for FCC metals the activation energy for diffusion along the grain boundaries is about ½ that of the activation energy for diffusion into the bulk. However, if the sample is left at an elevated temperature for sufficiently long time, diffusion into the bulk of the grain will also occur. Hence, the optimization of the processing temperature and time is necessary to obtain a preferential diffusion to the grain boundaries.

Clearly, under proper processing conditions it is possible to diffuse sufficient overlayer (top-layer) or underlayer materials to the magnetic layer grain boundaries while diffusing only small amounts into the bulk of the magnetic grains. Simply put, for a given time and temperature, the diffusion along the grain boundary is considerably more rapid that the diffusion through the bulk of the grain. Therefore, diffusion of the proper non-magnetic material may be used to obtain grain isolation while only causing a moderate decrease in the magnetic anisotropy energy density of the magnetic layer material. Obviously, the material chosen to provide the grain boundary exchange decoupling is important. When mixed in sufficient quantity with the Co alloy at the grain boundaries the resulting material should decouple the grains magnetically.

The need for lighter, smaller and better performing and less costly computers with greater storage density demands higher density recording media for use in hard disk drives, other magnetic storage devices, and other applications. It is an object of the present invention to meet those demands with a magnetic recording media having high coercivity, good thermal stability and low noise.

BRIEF SUMMARY OF THE INVENTION

The present invention is directed to the use of Zn containing layers positioned between a substrate and a magnetic layer, in contact with the magnetic layer, or in proximate or near contact with the magnetic layer. The Zn containing layer provides a magnetic recording media having increased coercivity and lower media noise. Diffusion of the Zn to the magnetic layer grain boundaries provides enhanced magnetic grain isolation and improved magnetic recording properties. The Zn containing layer may be incorporated in an underlayer structure, in the magnetic layer structure, or in the overlayer. As used herein, reference to the Zn containing layer as being "adjacent to" the Co or Co alloy layer shall include any one of the foregoing structural positions (between a substrate and a magnetic layer, in contact with the magnetic layer, or in proximate or near contact with the magnetic layer to permit diffusion of Zn to the magnetic layer grain boundaries). The Zn need only be in close proximity to the Co or Co alloy layer to be effective at providing a diffusional source for the Co or Co alloy grain boundaries.

Accordingly, the present invention includes a magnetic recording medium comprising a substrate, a magnetic thin film structure forming a magnetic recording layer, and a Zn containing layer. The Zn containing layer includes at least one of Zn, a solid solution Zn alloy, and a Zn containing crystalline structure composed of at least one other element. The zinc containing layer is disposed adjacent the magnetic layer. The magnetic layer may have a magnetic c-axis oriented substantially parallel to the magnetic layer. Alternatively, the magnetic layer may have a magnetic c-axis oriented substantially perpendicular to the magnetic layer.

The Zn containing layer may be made of a material selected from the group consisting of Zn, or Zn in combination with at least one element from the group consisting of Ag, Au, Cd, Ce, Cr, Co, Cu, Eu, Fe, Gd, Mg, Mn, Ni, Nd, Pr, Pd, Tb, Ti, Y, Yb, and Zr.

The recording medium of the invention may further include an underlayer disposed between the substrate and the Zn containing layer. The underlayer is made of a material selected to promote epitaxial crystalline structure in the magnetic layer. The underlayer is preferably made of a material selected from the group consisting of Cr, CrV, CrMo, CrW, CrTi, NiAl, AlCo, FeAl, FeTi, CoFe, CoTi, CoHf, CoZr, NiTi, CuBe, CuZn, AlMn, AlRe, AgMg, and Al$_2$FeMn$_2$.

The recording medium of the invention may further include an intermediate layer disposed between the substrate and the Zn containing layer. The intermediate layer preferably includes a material selected to promote epitaxial crystalline structure in the magnetic layer. The intermediate layer may be made of a material selected from the group consisting of Cr, Cr alloys and a material having a BCC derivative crystalline structure and a lattice constant substantially comparable to Cr.

The recording media can be incorporated in a data storage device having rotating, translating, or stationary media for use in conjunction with magnetic transducing heads for the recording and reading of magnetic data, as well as other applications.

The magnetic recording medium of the invention preferably includes a Co or Co alloy magnetic layer, and a Zn containing layer. The Zn containing layer can be formed from pure Zn, or Zn and another element or elements from the group Ag, Au, Cd, Ce, Co, Cu, Eu, Fe, Gd, Mg, Mn, Ni, Nd, Pr, Pd, Tb, Ti, Y, Yb, and Zr. Unfortunately, there are few binaries of Zn that actually form a pure body centered cubic crystal structure. Hence, when the Zn containing layer is part of the underlayer structure, while it is preferred that it be in a BCC structure it will most often and in particular, need to be a B2 crystal structure. The most preferred B2 structures include AgZn, AuZn, BaZn, CuZn, MnZn, TiZn, CeZn, TiZn, NbZn, NdZn, NiZn, PdZn, and ZrZn where the lattice spacings of the (112) or (002) texture is chosen to match and so to induce the Co alloy (10.0) unicrystal or (11.0) bicrystal structure. For example, the CuZn is preferred when used with a large lattice constant Pt containing Co alloy as the lattice constant of CuZn is 0.295 nm or about 2.3% larger than Cr. Another set of Zn containing B2 crystal structure group includes a rare earth element, such as DyZn, ErZn, EuZn, GdZn, HfZn, LaZn, LuZn, PrZn, SmZn, TbZn, TmZn, YZn, or YbZn. The rare earth-B2 crystalline structures are of particular interest because they almost always form line compounds. Hence, a slightly rich Zn rare earth combination results in a B2 crystal structure with excess Zn residing at the B2 grain boundaries, which are then readily available to diffuse to the magnetic layer structure grain boundaries. Even though Zn is insoluble in many BCC materials, the Zn would reside at the BCC grain boundaries and, hence, be readily available for diffusion. Hence, materials resulting from mixing Zn with BCC materials where the Zn is not soluble, but the BCC crystals are readily formed suffice as sources of Zn for diffusion. For example, Zn deposited with Cr or Cr alloys can provide Zn already at the underlayer grain boundaries and so physically aligned with the magnetic layer grain boundaries. Similarly, when an HCP intermediate layer is employed, Zn can be added to it. Just as with the insoluble BCC, the use of insoluble Zn in an HCP intermediate layer will perform a similar diffusion function. For example, Zn can be included in the non-magnetic CoCr alloys. Of course, it is clearly understood that it is possible to mix these materials, or to choose groups of three or more elements provided that at least one of them is Zn. Examples of three element B2 crystal structures containing Zn are Ni$_2$SiZn, Cu$_2$TiZn, Ni$_2$TiZn, and Cu$_2$ZrZn, the latter of which has a lattice constant approximately 3% larger than Cr.

Most preferably, the Co or Co alloy magnetic layer has an HCP structure and is deposited with its c-axis, the magnetic easy axis (the direction of the principle anisotropy energy density minimum), substantially parallel to the plane of the magnetic layer for longitudinal media and, for perpendicular media, substantially perpendicular to the plane of the magnetic layer.

The medium can further include additional layers in the underlayer structure, such as seed layers, underlayers, and intermediate layers. For example polycrystalline MgO has been taught as a preferred seed layer for longitudinal media in U.S. Pat. No. 5,800,931. The underlayers and/or intermediate layers used in addition to the Zn containing layer generally include materials having either an A2 structure, also known as a BCC crystal, or a BCC derivative, such as the B2, DO$_3$, or the L2$_1$-ordered crystalline structure, disposed between the seed layer and the magnetic layer. Materials having an A2 structure are preferably Cr or Cr alloys, such as CrV, CrMo, CrW, or CrTi. Materials having a B2-ordered structure having a lattice constant that is substantially comparable to that of Cr, include NiAl, AlCo, FeAl, FeTi, CoFe, CoTi, CoHf, CoZr, NiTi, CuBe, CuZn, AlMn, AlRe, AgMg, and Al$_2$FeMn$_2$, and most preferably, FeAl or NiAl. Materials having a DO$_3$-ordered structure include, for example, Fe$^{III}$Al, BeFe$^{III}$ and Mg$_3$La. A representative L2$_1$-ordered crystalline structure is AlNi$_2$Ti. An intermediate Zn containing layer is preferably disposed between the underlayer and the magnetic layer. However, it should also be understood that a thin underlayer or intermediate layer placed between the Zn containing layer and the magnetic layer can significantly improve the preferential diffusion of the Zn to the magnetic layer grain boundaries by inhibiting diffusion to the bulk of the individual magnetic grains. The objective in this case is that diffusion to the magnetic layer grain boundaries can occur essentially only via the adjacent non-Zn containing layer grain boundaries. That is, in a well grown epitaxial structure the grain boundaries of one layer are predominately aligned with the grain boundaries of the next layer. Furthermore, it is desirable that the non-Zn containing layer have a very low or no Zn solubility. For example, Zn does not appear to dissolve into W or V and there is little evidence that it dissolves into Cr. When a non-Zn containing layer is placed between the Zn containing layer and the magnetic layer structure the thickness of non-Zn containing layer should be only comparable in thickness to the magnetic layer structure thickness. Preferably, the non-Zn containing layer thickness would be no more than 10 times the thickness of the magnetic layer structure thickness and most preferably less than the magnetic layer thickness. Clearly, the underlayer structure may be formed of multiple layers wherein each layer is a different one of the foregoing materials.

More than one magnetic layer can be incorporated in the media and it can also include one or more inner layers disposed between the magnetic layers. The inner layers are typically about 10 to 40 Å thick and composed of Cr or Cr alloy, but they can also be the Zn containing layer of the present invention. However, because it is desirable to keep the magnetic layer structure as thin as possible, it is preferred that the magnetic layer structure be composed of no more than two magnetic layers, and most preferably composed of a single layer.

The magnetic layer may be covered by an overlayer, which, in turn, may be covered by an overcoat. An organic lubricant is preferably added over the overcoat to reduce frictional wear of the media. The overlayer may be comprised of Zn or a Zn containing material.

The present invention includes a method of producing a magnetic layer containing grain boundaries on a recording substrate and then preferentially diffusing Zn to said grain boundaries. The method comprises disposing an underlayer structure to cause epitaxial growth of the said magnetic layer, disposing a magnetic layer, disposing a Zn containing layer adjacent to the magnetic layer, and diffusing Zn to the magnetic layer grain boundaries, which is preferably done by heating the Zn containing layer. Heating the Zn containing layer may occur after the deposition of the magnetic layer and Zn containing layer, or alternatively, before deposition of the magnetic layer. Zn is disposed in an amount sufficient to promote isolation of the magnetic grains. The method may further include interposing an intermediate layer between the Zn containing layer and the magnetic layer.

The present invention also includes a method for using a Zn containing alloy as a sputtering target for the production of magnetic recording media having a Zn containing layer, particularly thin film magnetic recording media as described herein.

The exact process of producing the media with an optimum Zn diffusion is dependent upon the vacuum system capabilities and optimization for both performance and manufacturing cost. In the latest modern single disk deposition systems, where one disk is coated with one material at a time, the rate of deposition can be very fast. For example, it is very common in these systems to deposit several tens of nanometers of material in only a few seconds. On the other hand, in pallet style deposition systems where several disks are coated with one layer at the same time (parallel deposition), it is common for the deposition rate to be somewhat slower. Likewise, in a deposition system designed for research or development studies, where versatility of the choice of materials is of importance, as opposed to the low cost manufacturing of media, the deposition of a single material layer may take several minutes. For this reason, the deposition temperature may be adjusted considerably to obtain a similar diffusion of material at the material microstructure level. While a deposition process, and material system, such as the ones described herein can be optimized for Zn diffusion during the steps of layer deposition, it is also the case that the diffusion of the materials may be more effective if done after all layers, or only some of the layers, have been deposited. This is especially true when the deposition processes are slow. One very effective approach to achieve this optimization is to perform a post deposition thermal anneal to achieve the desired level of diffusion. In this embodiment, the most preferred approach is to perform a higher temperature anneal to cause diffusion of Zn after both the Zn containing layer and the magnetic layer have been deposited.

Accordingly, the present invention provides magnetic recording media and data storage devices incorporating recording media having high coercivity and lower noise for use in hard disk drives and other data storage applications. These advantages and others will become apparent from the following detailed description.

BRIEF DESCRIPTION OF THE DRAWINGS

The advantages of the present invention can be better understood by reference to the drawings in which:

FIGS. 1d & 1e shows schematic illustrations, both with and without a Zn containing layer, that are typical of media thin film structures only with an extra CrTi overlayer and without and overcoat layer;

FIG. 3 shows magnetic properties, $H_c$ and $M_s$, versus annealing temperature for a Zn containing structure and a one-minute annealing time;

FIG. 4 shows normalized magnetic properties, $H_c/H_{c0}$ and $M_s/M_{s0}$, versus annealing temperature for a Zn containing structure and a one minute annealing time;

FIG. 5 shows magnetic properties, dM peak values and S*, versus annealing temperature for a Zn containing structure and a one minute annealing time;

FIG. 6 shows magnetic properties, $H_c$ and $M_s$, versus annealing temperature for a non-Zn containing structure and a one minute annealing time;

FIG. 7 shows normalized magnetic properties, $H_c/H_{c0}$ and $M_s/M_{s0}$, versus annealing temperature for a non-Zn containing structure and a one minute annealing time;

FIG. 8 shows magnetic properties, dM peak values and S*, versus annealing temperature for a non-Zn containing structure and a one minute annealing time;

FIG. 9 shows magnetic properties, $H_c$ and $M_s$, versus annealing time for a Zn containing structure and a 350° C. annealing temperature;

FIG. 10 show normalized magnetic properties, $H_c/H_{c0}$ and $M_c/M_{s0}$, versus annealing time for a Zn containing structure and a 350° C. annealing temperature;

FIG. 11 shows magnetic properties, dM peak values and S*, versus annealing time for a Zn containing structure and a 350° C. annealing temperature; and, FIG. 12 is a representation of a grain boundary model showing diffusion of Zn along the grain boundaries of the magnetic layer.

DETAILED DESCRIPTION OF THE INVENTION

The recording media of the invention can be embodied in a rotating, translating, or stationary data storage device, such as a rigid magnetic disc incorporated into a disc drive (not shown). Typically, the disc drive includes a magnetic transducing head, or slider, supported on a movable arm in a suspension assembly used for moving the head over the surface of the disc. The transducing head is maintained in a closely spaced, parallel relationship relative to the surface of the disc during normal operation. A typical distance between the head and the disc is less than 10 μin. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, each of which are incorporated herein by reference. The magnetic recording media of the present invention may also be used with flexible magnetic discs, floppy discs, or tape using known flexible substrates.

Figures 1A, 1B, 1C:
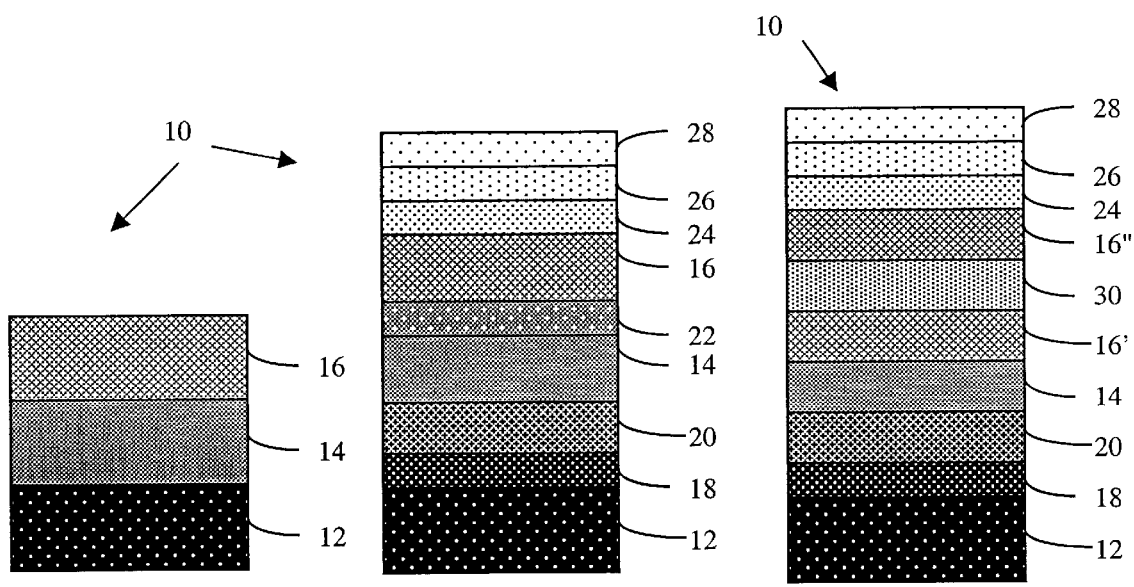
FIGS. 1a, 1b, and 1c shows schematic illustrations of magnetic media with Zn containing layers.

Referring to FIG. 1(a), the magnetic recording medium 10 of the present invention is comprised of a substrate 12, formed of a nonmagnetic material, such as glass, glass ceramic, Si, SiC or an aluminum alloy coated with NiP, a Zn containing layer 14, and a magnetic layer 16. In addition, as shown in FIG. 1(b), a seed layer 18 can be disposed on the substrate 12, as well as an underlayer 20. An intermediate layer 22 may also be disposed between the Zn containing layer 14 and the magnetic layer 16. The magnetic layer 16 can be covered using an overlayer 24, which may contain Zn followed by an overcoat 26 and an organic lubricant 28. In another embodiment, shown in FIG. 1(c), the Zn containing layer may be disposed as the overlayer 24 on the magnetic layer structure or even as an inner layer 30 disposed between the first magnetic layer 16' and a second magnetic layer 16". FIG. 1(c) shows three possible Zn containing layers. Any one or a combination of the positions shown may be used as well as the positions for the Zn containing layer shown in the other figures and/or described herein.

In a preferred embodiment, the Zn containing layer 14 or 24 has zero magnetic moment and is in contact with a Co or Co alloy magnetic layer 16. However, it should be appreciated that the Zn containing layer can be included in the media 10 as a seed layer, an underlayer, an inner layer, or an overlayer, in addition to, or in lieu of, its use as an intermediate layer provided the distance between the Zn containing layer and the magnetic layer is not so great that diffusion of the Zn along grain boundaries to the grain boundaries of the magnetic layer is not likely to occur. Higher coercivities have been obtained in the resulting media 10, when the Zn containing layer 14 or 24 and the magnetic layer 16 are in contact, as opposed to embodiments incorporating an intermediate layer 22 between the Zn containing layer 14 and the magnetic layer 16.

An effective amount of Zn is used to produce a Zn containing layer that is sufficiently thick to provide a sufficient amount of Zn to diffuse to the grain boundaries of the crystallites of the magnetic layer 16 that results in the magnetic media 10 having desired magnetic properties. For example, it is desirable that the magnetic coercivities and exchange decoupling exceed those produced in the absence of the Zn containing layer or are comparable to or exceed those in the prior art.

In a current embodiment, employing a pure Zn overlayer, or a ZnMn, ZnAu or a Cuzn containing layer or intermediate layer, as the Zn containing layer, the desired magnetic properties can be achieved when the Zn containing layer is preferably at least 1 nm thick, and most preferably greater than 10 nm thick. The skilled artisan will appreciate that, based on guidance provided herein, Zn containing layers thinner than 1 nm may also be effective at producing the desired magnetic properties, e.g., decoupled grains which promote high coercivities and low noise. The minimum effective amount of Zn to be added to the magnetic media structure is the amount below which the enhanced magnetic properties will not be observed. That amount can be determined by routine procedures.

Sputter depositing the Zn containing layer at room temperature provides magnetic media having magnetic properties comparable to magnetic media employing a Cr underlayer without the Zn containing layer. An incentive to use the AuZn, ZnMn or CuZn as an underlayer is that a B2 crystalline structure is formed which provides the crystalline texture necessary for the epitaxial growth of a HCP crystal structure in the Co alloy. In a preferred embodiment, a NiAl underlayer is deposited prior to the Zn containing layer. Since it has been shown in U.S. Pat. No. 5,993,956, and further elucidated in J. Zou, D. E. Laughlin, and D. N. Lambeth, MRS Symp. Proc., vol. 517, pp 217–22 (1998), that Mn can diffuse along grain boundaries from an underlayer material containing Mn, an even more desirable structure is achieved with the combination of a Zn containing layer positioned as an overlayer and a Mn containing layer positioned as an underlayer. The resulting combined diffusion of Zn and Mn to the cobalt grain boundaries provide enhanced grain to grain isolation. Of course, in some media cases, the reverse ordering of the Mn and Zn containing layers with respect to the magnetic layer structure can be as effective.

In one preferred embodiment, a Cr alloy underlayer and the Zn containing layer 14 and the magnetic layer 16 are sputter deposited on a substrate 12 that has been preheated to an elevated temperature, such as 250° C. The resulting media 10 containing the Zn containing layer 14 has higher coercivity than does media 10 produced without preheating the substrate 12. It may be that the increased temperature promotes the Cr (002) texture and that the Zn grain boundary diffusion rates are somewhat a function of the resulting media crystalline textures. It is expected that the elevated temperature selected for depositing the magnetic layer 16 will be a function of the deposition rate and also that the heating can be performed during or after the production of the magnetic layer 16. For example, commercial deposition rates are substantially higher; therefore, it may be necessary to increase the temperature above 250° C. to achieve the increased magnetic properties observed at lower deposition rates. In general however, it was found that a post deposition anneal after the Co alloy and the Zn containing layer had both been deposited was preferred to promote the preferential Zn diffusion to the grain boundaries. Unfortunately, unlike CrMn and number of other BCC Mn alloys, Zn does dissolve into Cr to form a substitutional solid solution. Therefore, Zn in Cr is not readily available as a target to form a BCC underlayer.

On the other hand, zinc is a metal with a low melting point of 419.58° C., thus it can have a large diffusion coefficient into magnetic materials. Furthermore, it is non-magnetic. This makes it potentially a good diffusant to diffuse into the magnetic grain boundaries at relatively low temperatures. The properties of bulk lattice diffusion of Zn in Co are available in Landolt-Bornstein Numerical Data and Functional Relationships in Science and Technology, Vol. 26, edited by H. Mehrer, published by Springer-Verlag, page 132. The only data available are for measurements at high temperatures above 800° C. and thus Co is in FCC phase. There is no data that applicants are aware of for the diffusion of Zn in HCP Co. However, the diffusion constants for Zn in HCP Co should be similar to those of Zn in FCC Co, since HCP and FCC are both close packed crystal structures and the only difference between the two is the stacking sequence of atoms. On page 132 of the referenced text the following is given:

$D_0 = 1.2 \times 10^{-5}$ m$^2$/sec $Q = 266.7$ kJ/mol

There is no grain boundary diffusion data that applicants are aware of for Zn in Co. In the above once on page 649, the activation energies for grain boundary diffusion and bulk lattice Zn in Cu are given as $Q = 190.8$ kJ/mol, bulk lattice diffusion $Q_b = 98.68$ kJ/mol, grain boundary diffusion The ratio of the bulk to grain boundary activation energies, $Q_b/Q$, for diffusion of Zn in Cu is about 0.517. Since Cu and Co are nearly the same size and near each other on the periodic table, and Cu is the FCC phase, it is assumed that $Q_b/Q$ for diffusion of Zn in Co is similar to the above value. Even though $D_0$ for grain boundaries are probably similar or higher than the bulk values, in our example calculation here, we conservatively assume that $D_0$ for grain boundary diffusion has the same value as for bulk lattice diffusion of Zn in Co. Hence, the diffusion distance in 60 sec is estimated for two temperatures:

| T (° C.) | Grain boundary | Bulk lattice |
|---|---|---|
| 250 | 4 nm | $1 \times 10^{-6}$ nm |
| 350 | 45 nm | $2 \times 10^{-4}$ nm |

Thus, even though both the diffusion distance in the bulk and at the grain boundaries increase with temperature in order to have a truly significant diffusion distance a higher temperature is needed. At the elevated temperature, diffusion at the grain boundaries is approximately $10^5$ times that in the bulk of the grains. Clearly, grain boundaries are much faster diffusion channels and preferential diffusion of Zn into the grain boundaries has been found to occur. Furthermore, the diffusion distance in grain boundaries at 350° C. is 10 times that at 250° C. In general, this preferential diffusion along the grain boundaries is common for many materials. Sometimes, in state of the art HCP Co alloy media preparation, the substrate is preheated in the deposition vacuum system. The substrate cools as it is moved away from the preheating position to the deposition positions. Deposition of the layers then occurs at temperatures less than 250° C. It can be seen from this illustrative calculation that for a short elevated temperature time, and temperatures below 250° C., diffusion of Zn to the magnetic layers would be relatively ineffective. However, the exact effectiveness of the diffusion is difficult to estimate the manner just illustrated as some diffusion may occur during the magnetic layer deposition. However, it is now obvious why the above reference sites the diffusion coefficent and the activation energies at such elevated temperatures. It is very difficult to measure these diffusion distances at the lower temperatures, even though they maybe effective as described here in. In fact the change dramatic changes in magnetic characteristics of thin films is a sensitive indication of the effectiveness of diffusion to the magnetic grain boundaries.

A teaching that the general diffusional process is time and temperature dependent can also be found in "Phase Transformations in Metals and Alloys" by David A. Porter and Kenneth E. Easterling, Publisher: Van Nostrand Reinhold Company, pages 98–102; and, "Physical Metallurgy, Part 1", edited by R. W. Cahn and P. Haasen, Publisher: North-Holland Physics Publishing. In addition, diffusion of other alloying elements in pure Co films is described in "Interdiffusion and Grain Isolation in Co/Cr Thin Films", Y. C. Feng, D. E. Laughlin and D. N. Lambeth, IEEE Transactions on Magnetics, Vol. 30, No. 6, (November 1994), which is incorporated herein by reference. One skilled in the art will appreciate that the temperatures at which the Zn containing layer and the Co alloy are disposed on the media 10 and then the temperature of annealing, whether during or post deposition, can be varied to produce media having a range of magnetic properties. In fact, as discussed in the above cited Feng reference, one skilled in the art will appreciate that the thermal post treatment, such as a relatively slow anneal, on the time scale of several minutes, or a rapid thermal anneal (RTA), on the times scale of one minute or less, can be used to promote Zn diffusion from the Zn containing layer to the grain boundaries of the Co alloy magnetic layer. However, it has been found, and is preferred, that the annealing time be kept to a minimum to promote the preferential grain boundary diffusion.

As illustrative of the effective results of Zn diffusion, FIGS. 1(d) and 1(e) shows a schematic illustration of two comparative thin film structures. These illustrations, while slightly different from the media of FIGS. 1(a), 1(b) and 1(c), show structures with, and without, Zn as an overlayer 24. A second overlayer 26 of CrTi of the same composition as the CrTi intermediate layer, is employed to prevent oxidation of the CoCrPt alloy magnetic layer and the Zn overlayer during a post thermal anneal in air.

Figure 2:
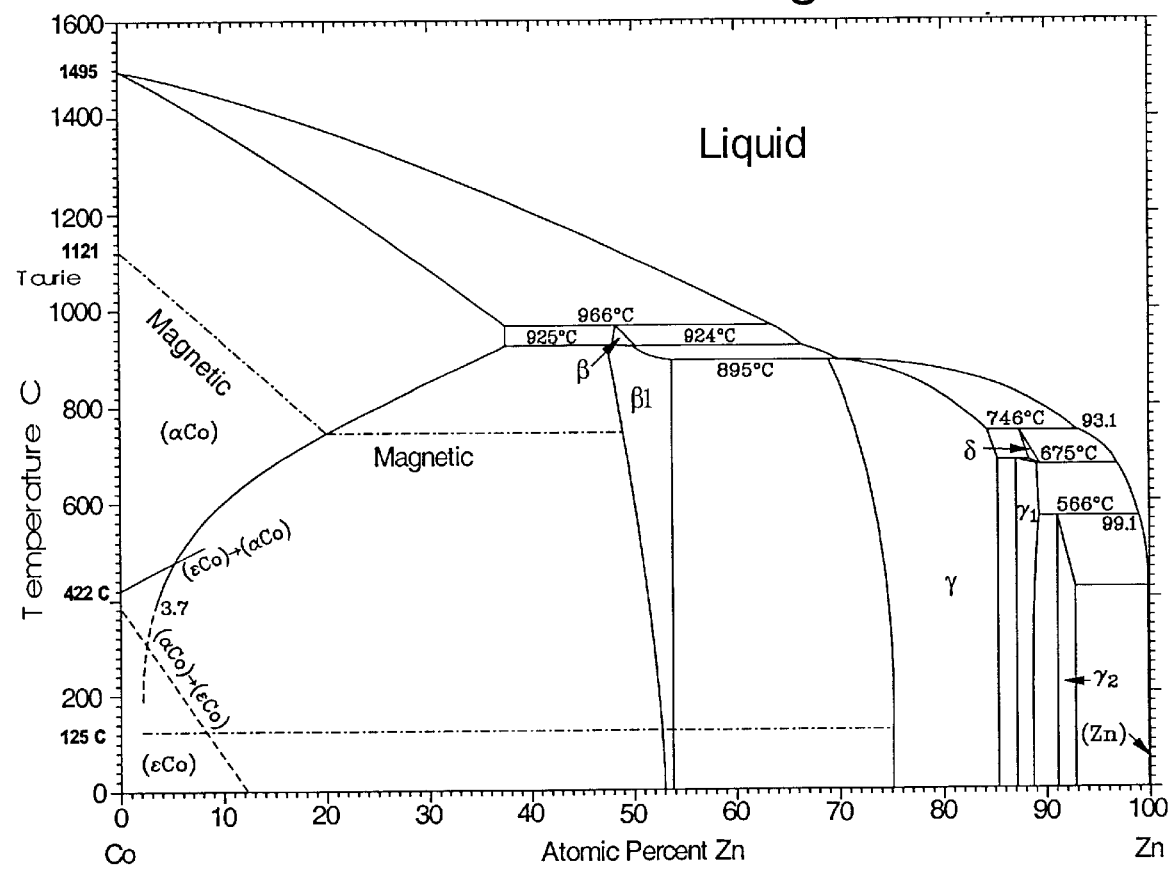
FIG. 2 shows the Co—Zn equilibrium phase diagram.
Figure 12:
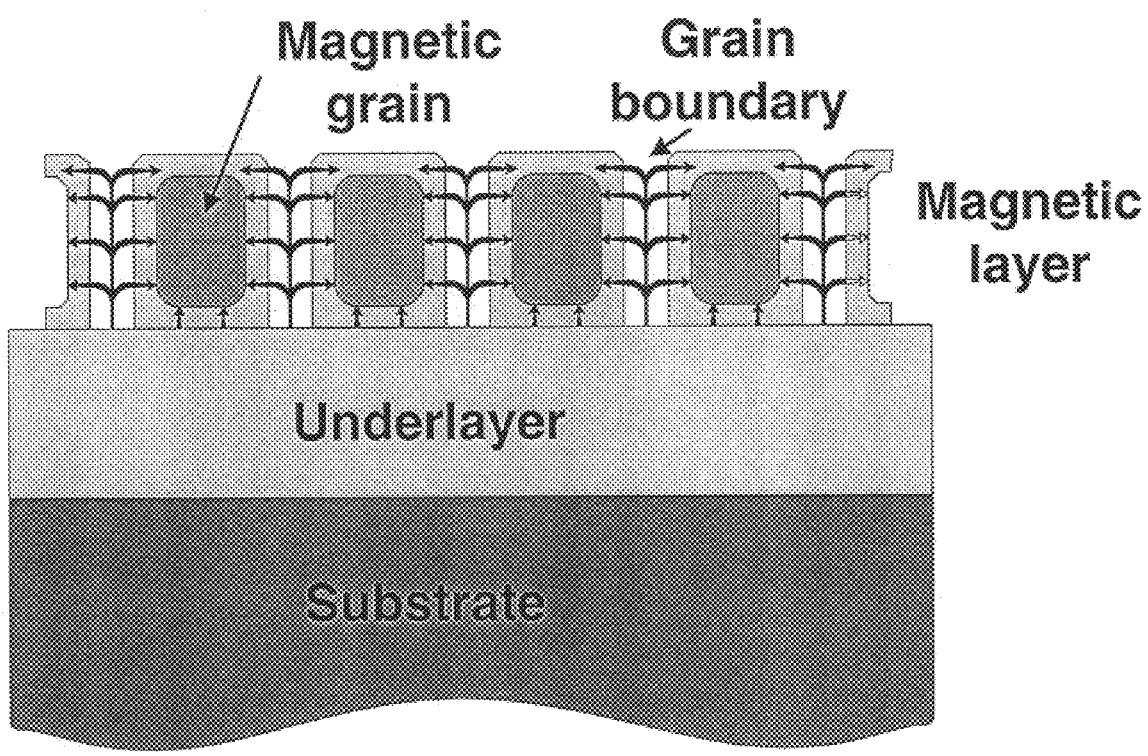

For reference only, FIG. 2 shows the equilibrium binary phase transition temperatures for Co and Zn. Similar phase diagrams containing express citations of a number of specific phase transition temperatures for the binary alloys mentioned earlier can be found in "Binary Alloy Phase Diagrams", $2^{nd}$ ed. plus updates, ASM International (1996). The transition from HCP to FCC Co is noted at 422° C. Small regions of Co FCC structure located in a HCP Co grain represent lattice stacking faults and lower the HCP anisotropy considerably. It is of interest that the incorporation of zinc into cobalt increases the transformation temperature of HCP Co to FCC Co, as shown in the Co-Zn phase diagram in FIG. 2. This may decrease the number of HCP Co grains containing FCC regions, defects or stacking faults in the Co alloy magnetic films resulting in increasing the Ku. On the other hand, when the cobalt grains are not well formed, e.g., when stacking fault defects occur at the surface and inside the HCP Co crystals, the Co grain surfaces can appear more FCC-like than HCP-like. When Zn diffuses to the HCP Co alloy layer at an elevated temperature, the Zn tends to alloy with the grain surface or materials at the grain boundary. Hence, it is believed that when in sufficient quantity, or at low temperatures, the resulting grain boundary material is non-ferromagnetic and provides both grain to grain magnetic isolation, as well as improving the HCP structure of the HCP Co alloy material. It is interesting to note in the Co-Zn phase diagram shown in FIG. 2, that the b1 region is a B2 crystal structure that may be also suitable as an underlayer for longitudinal Co alloy media. A B2 CoZn underlayer that is slightly rich in Zn may be quite suitable for promoting epitaxial growth of Co alloy while also providing a Zn containing layer.

Utilizing thin film structures as shown in FIGS. 1(d) and 1(e), an illustrative, comparative study of the effects of zinc interdiffusion into CoCrPt alloy films via post-deposition rapid thermal annealing (RTA) is provided. The two sample structures of FIGS. 1(d) and 1(e) are with, and without, a Zn containing layer 24. The Zn containing layer has been placed in the overlayer position, and the deposition temperatures are relatively low so that similar magnetic properties can be obtain for both structures prior to any annealing steps. In this manner, the effectiveness of Zn diffusion can be clearly observed. A 1000 Å thick NiAl underlayer 20, a 100 Å thick CrTi intermediate layer 22, a 300 Å thick CoCrPt magnetic layer 16, a 200 Å thick Zn overlayer 24, and a 200 Å thick CrTi protection overcoat layer 26, were successively deposited at near room temperature onto glass substrates by RF diode sputtering. The topmost CrTi layer was used to protect the Zn and CoCrPt layers from oxidation during the RTA. Due to the increased lattice constant of Co-Pt alloys with Pt additions, the Ti composition of the CrTi alloy target was increased to Cr20at % Ti. This provides a larger lattice constant than pure Cr and so provides a better lattice match, to induce epitaxial growth, in the high Pt content CoCrPt alloy film. The CoCrPt film composition was Co12at % Cr18at % Pt, measured by energy dispersive x-ray spectroscopy (EDX). The Ar sputtering pressure was 10 mTorr. Post-deposition annealing was performed at atmospheric pressure under Ar flow. A series of repeated 1 minute post-deposition rapid thermal annealing experiments, while increasing the maximum temperature from 250° C. to 450° C., were performed on the samples with both structures. FIG. 3 shows the coercivity Hc and magnetization Ms as functions of the annealing temperature and FIG. 4 shows the normalized coercivity Hc/Hco and the normalized magnetization Ms/Mso, for the sample containing the Zn top layer. Hco and Mso are the coercivity and magnetization prior to the annealing, respectively. The coercivity increased, while the magnetization decreased, with the higher annealing temperatures. At 450° C., the coercivity increased by 60% to 5900 Oe, one of the highest coercivities ever reported for HCP Co alloy films, while the Ms decreased by only about 33%. FIG. 5 shows the effects of annealing temperature on the dM peak and S* values. Both decreased as the annealing temperature increased indicating decoupling of the magnetic grains. At 450° C., the dM peak value decreased to almost zero, indicating that the granular exchange coupling was significantly reduced. This is due to the increased degree of CoCrPt grain isolation.

For the reference sample without the Zn layer, FIGS. 6, 7, and 8 show the same set of magnetic properties vs. the annealing temperature. As the annealing temperature was increased, the coercivity actually decreased, while the dM peak value remained high. This clearly indicates that the improvement in magnetic properties shown is due to the presence of the Zn layer. In fact, this improvement dominates over the detrimental effects of annealing without a Zn layer. The interdiffusion of Zn into CoCrPt grain boundaries is the mechanism for this improvement.

Another series of annealing experiments were performed to illustrate the effect of annealing time when the annealing temperature is near optimum. In this study, the temperature was held constant at 350° C. and while the results of a sequence of annealing times of 1, 2, 4, 8, 12 minutes were obtained. The magnetic properties of these samples are shown in FIGS. 9, 10, and 11. The magnetization, dM peak and S* values decreased, while the coercivity increased for the longer annealing times. At the annealing time of 12 minutes, the coercivity increased 39% to 4900 Oe, while the magnetization decreased only 20%. These improved Hc, dM, S* magnetic properties clearly indicates the preferential Zn diffusion effects to the grain boundaries. However, upon longer annealing times the properties began to degrade.

The above experimental results show that zinc interdiffusion into CoCrPt magnetic films driven by post deposition annealing significantly lowers the Co alloy granular exchange coupling via improved grain isolation, dramatically increases coercivity, but causes only a relatively moderate decrease in magnetization. When the Zn containing layer is on top of the magnetic layer as in an overlayer it is desirable to keep it at thin as possible to facilitate keeping the playback transducer close to the magnetic layer. It has been found for some magnetic layers that Zn layers as thin as 1.0 nm are effective at improving the magnetic properties of the media. The principle criteria for the choice of Zn layer thickness and Zn concentration is that sufficient Zn be provided to diffuse to the magnetic layer grain boundaries to be effective. It is easily understood that this amount is a function of magnetic layer thickness and composition. Most current magnetic media, whether for longitudinal or perpendicular recording application, is based upon the HCP Co alloys, with various additions such as Cr, Pt, Ta, B, Nb, Ni, P, and Si. To a greater or lessor degree the improvements obtained by this Zn diffusion mechanism will work for these magnetic materials as well. For example, the magnetic layers for HCP longitudinal media are preferably a Co or Co alloy film, such as CoCr, CoP, CoNi, CoPt, CoNiCr, CoNiZr, CoPtNi, CoCrTa, CoCrPt, CoCrP, CoCrTaSi, CoCrPtSi, CoCrPtB, CoCrPtTa, CoCrPtTaB, CoCrPtTaNb or other known Co alloy magnetic films and are each about 2.5–50 nm (25–500 Å) thick. Similar compositions are HCP Co alloys used for perpendicular recording. However, BCC or BCC derivatives are seldom used as underlayer structures for perpendicular recording media. Due to the desired(00.2) Co alloy texture, to induce epitaxial growth an underlayer structure should present a texture that has a triangular or HCP (0001) atomic surface geometry. A commonly used HCP underlayer for this perpendicular orientation is Ti. Likewise, under the proper conditions a (111) textured face centered cubic (FCC) or a FCC derivative crystal could also be used. However, with this invention it is now evident that a Zn containing layer disposed for such perpendicular media, in a similar manner as described for the longitudinal media, would be beneficial at promoting isolated magnetic switching units or grains. Furthermore, it is also now evident that when used between the magnetic layer and the substrate that the Zn containing layer should have a crystalline structure and a texture suitable to induce the perpendicular magnetic c-axis. Whereas, this is unlike the case where the Zn containing layer is on top of the magnetic layer and the crystal structure of the Zn containing layer is of relative unimportance. For example, for perpendicular HCP Co alloy media, AgZn, AuZn and AlZn all represent HCP structures when deposited with (00.2) texture would tend to induce the HCP Co (00.2) texture and provide a Zn diffusional source. In addition, due to a search for even higher anisotropy energy densities, other non-HCP Co based magnetic materials, such as CoPt, CoPr, and SmCo and other rare earth-cobalts, as well as Co-Pt and Co-Pd quasi-superlattice structures, are being studied for use as magnetic media. Furthermore, due too their high potential anisotropy energy densities a number of non-Co based magnetic materials are also being studied as candidates for magnetic recording media. Examples of these include FePt and FePd with the CuAu crystal structure, NdFeB, SmFe and other rare earth-irons complex crystal structures, MnBi and MnAl with face centered tetragonal structure. It is anticipated that Zn additions when properly added to the layer structures used in building these media structures will also be beneficial at promoting grain isolation.

In addition, with this invention, the concepts of this method are now well understood and it is anticipated that the isolation effects are applicable to a wide variety of magnetic materials as well as Co materials and alloys. Layers of Zn, Zn containing materials deposited on top of, underneath, and/or in close proximity to the magnetic layer can be used to provide similar grain isolation effects. Substrate preheating, prior to the deposition, or other heat treatments, such as can be performed directly in the thin film vacuum deposition system or after the media is removed from the vacuum system, can also be applied to induce the zinc interdiffustion.

From the above discussion, it is seen that the magnetic Co alloy grains need to be magnetically isolated and that the FCC Co phase is detrimental, as the symmetry of cubic materials results in a low anisotropy energy density. Thus, preferential placement of Zn at the Co alloy grain boundaries can result in isolated magnetic particles and potentially with fewer particles having a FCC phase component at the grain surfaces. Either of these two characteristics result in lower media noise due to the effective smaller grain size, better anisotropy energy density, due to grain to grain isolation that helps to prevent domain wall motion, and improved anisotropy energy density due to reduced FCC vs. HCP phases in the magnetic media grains.

These compositions, layer structures, layer thicknesses, processing conditions and processing methods are only meant to provide illustrative examples. It should be recognized that one trained in the field will understand how to adjust, change or modify significantly these media preparation attributes, and still obtain similar benefits of the Zn containing layer. Those of ordinary skill in the art will appreciate that a number of modifications and variations can be made to specific aspects of the method and apparatus of the present invention without departing from the scope of the present invention. Such modifications and variations are intended to be covered by the foregoing specification and the following claims.

What is claimed is:

1. A magnetic recording medium comprising:
   a substrate;
   a Co or Co alloy magnetic thin film structure forming a magnetic recording layer; and
   a Zn containing layer comprised of at least one of Zn, a solid solution Zn alloy, and a Zn containing crystalline structure composed of at least one other element, said zinc containing layer being disposed adjacent said magnetic layer in an amount effective for said Zn to diffuse into said magnetic layer wherein said magnetic layer includes grains having grain boundaries and said Zn is diffused into the grain boundaries of said magnetic layer.

2. The recording medium recited in claim 1 wherein said magnetic layer has a magnetic c-axis oriented substantially parallel to said magnetic layer.

3. The recording medium recited in claim 1 wherein said magnetic layer has a magnetic c-axis oriented substantially perpendicular to said magnetic layer.

4. The recording medium recited in claim 1 wherein said Zn containing layer comprises Zn or Zn in combination with at least one element selected from the group consisting of Ag, Au, Cd, Ce, Cr, Co, Cu, Eu, Fe, Gd, Mg, Mn, Ni, Nd, Pr, Pd, Tb, Ti, Y, Yb, and Zr.

5. The recording medium recited in claim 1 wherein said Zn containing layer is comprised predominately of one of Zn or MnZn.

6. The recording medium recited in claim 1 wherein said Zn containing layer is comprised of Zn in a BCC derivative crystalline structure.

7. The recording medium recited in claim 1 wherein said Zn containing layer is at least 1 nm thick.

8. The recording medium recited in claim 1 wherein said Zn containing layer is up to 10 nm thick.

9. The recording medium recited in claim 1 wherein said magnetic layer is comprised of a Co or Co alloy material of an HCP crystalline structure.

10. The recording medium recited in claim 9 wherein said magnetic layer is selected from the group consisting of CoCr alloys, CoCrPt alloys and CoCrTa alloys.

11. The recording medium recited in claim 1 further comprising an underlayer disposed between said substrate and said Zn containing layer, said underlayer being comprised of a material selected to promote epitaxial crystalline structure in said magnetic layer.

12. The recording medium recited in claim 11 wherein said underlayer is comprised of a material selected from the group consisting of Cr, CrV, CrMo, CrW, CrTi, NiAl, AlCo, FeAl, FeTi, CoFe, CoTi, CoHf, CoZr, NiTi, CuBe, CuZn, AlMn, AlRe, AgMg, and $Al_2FeMn_2$.

13. The recording medium recited in claim 11 wherein said underlayer is comprised of a material selected from the group consisting of Cr, Cr alloys and a material having a BCC derivative crystalline structure and a lattice constant that substantially matches the lattice constant of Cr or CrV.

14. The recording medium recited in claim 1 further comprising at least one underlayer.

15. The recording medium recited in claim 1 further comprising an intermediate layer disposed between said substrate and said Zn containing layer comprised of a material selected to promote epitaxial crystalline structure in said magnetic layer.

16. The recording medium recited in claim 15 wherein said intermediate layer is comprised of a material selected from the group consisting of Cr, Cr alloys and a material having a BCC derivative crystalline structure and a lattice constant that substantially matches the lattice constant of Cr.

17. The recording medium recited in claim 16 wherein said intermediate layer is comprised of a material selected from the group consisting of Cr, CrV, CrMo, CrW, CrTi, NiAl, AlCo, Fe Al, FeTi, CoFe, CoTi, CoHf, CoZr, NiTi, CuBe, AlMn, AlRe, AgMg, and $Al_2FeMn_2$.

18. The recording medium recited in claim 15 wherein said intermediate layer is comprised of a non-magnetic HCP crystalline structure.

19. The recording medium recited in claim 18 wherein said intermediate layer is a material selected from the group consisting of CoCr alloys.

20. The recording medium recited in claim 1 further comprising a second magnetic layer, wherein said magnetic layer lies between said second magnetic layer and said substrate.

21. The recording medium recited in claim 20 further comprising a Zn containing inner layer disposed between said magnetic layer and said second magnetic layer.

22. The recording medium recited in claim 1 wherein said Zn containing layer is comprised predominately of one of Zn or CuZn.

23. A magnetic recording medium comprising:
   a substrate;
   a Co or Co alloy film forming a magnetic recording layer having an epitaxial crystalline structure; and
   a Zn containing layer comprised of one of Zn, a solid solution Zn alloy, or a Zn crystalline structure adjacent said magnetic layer, wherein said magnetic layer is between said substrate and said Zn containing layer and said Zn is present in an amount effective for diffusion of said Zn into said magnetic layer wherein said magnetic layer includes grains having grain boundaries and said Zn is diffused into the grain boundaries of said magnetic layer.

24. A magnetic recording medium comprising:

a substrate;

a Co or Co alloy film forming a magnetic recording layer having an epitaxial crystalline structure;

a Mn containing underlayer where said underlayer is between said substrate and said Co or Co alloy film; and, a Zn containing layer comprised of one of Zn, a solid solution Zn alloy, or a Zn crystalline structure containing at least one other element, said Zn containing layer being in contact with said magnetic layer, wherein said magnetic layer is between said substrate and said Zn containing layer and said Zn is present in an amount effective for diffusion of said Zn into said magnetic layer wherein said magnetic layer includes grains having grain boundaries and said Zn is diffused into the grain boundaries of said magnetic layer.

25. An apparatus for data storage comprising:

a magnetic recording medium comprising, a substrate, a Co or Co alloy film forming a magnetic recording layer, and, a Zn containing layer comprised of one of Zn, a solid solution Zn alloy, or a Zn containing crystalline structure containing at least one other element, said Zn containing layer being disposed between said magnetic layer and said substrate to provide epitaxial growth of said magnetic layer, said Zn being present in an amount effective for diffusion of said Zn into said magnetic layer wherein said magnetic layer includes grains having grain boundaries and said Zn is diffused into the grain boundaries of said magnetic layer; and, a magnetic transducer positioned sufficiently close to said medium to permit said transducer to record and read data to and from said medium.

26. The apparatus recited in claim 25 wherein said medium is rotatable relative to said transducer.

* * * * *

UNITED STATES PATENT AND TRADEMARK OFFICE
CERTIFICATE OF CORRECTION

PATENT NO.      : 6,432,563 B1                                                Page 1 of 1
DATED           : August 13, 2002
INVENTOR(S)     : Jie Zou, David N. Lambeth and David E. Laughlin It is certified that error appears in the above-identified patent and that said Letters Patent is hereby corrected as shown below:

Column 3,
Line 3, delete "circumferencial" and insert -- circumferential --.
Linr 54, delete "circumferencially" and insert -- circumferentially --.

Column 6,
Line 52, delete "modem" and insert -- modern --.

Column 15,
Line 4, delete "once" and insert -- reference --.
Line 6, after the word "lattice" insert -- diffusion of --.
Line 51, delete "coefficent" and insert -- coefficient --.

Column 18,
Line 14, delete "lessor" and insert -- lesser --.

Signed and Sealed this

Eleventh Day of February, 2003

JAMES E. ROGAN
*Director of the United States Patent and Trademark Office*